United States Patent
Gray et al.

(10) Patent No.: US 9,555,768 B2
(45) Date of Patent: *Jan. 31, 2017

(54) RETRACTOR PRETENSIONER ASSEMBLY

(71) Applicant: Autoliv ASP, Ogden, UT (US)

(72) Inventors: Mark F. Gray, Macomb, MI (US); Kenneth H. Kohlndorfer, Roseville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/286,184

(22) Filed: May 23, 2014

(65) Prior Publication Data

US 2015/0336539 A1 Nov. 26, 2015

(51) Int. Cl.
*B60R 22/46* (2006.01)

(52) U.S. Cl.
CPC .... *B60R 22/4628* (2013.01); *B60R 2022/4642* (2013.01)

(58) Field of Classification Search
CPC ............... B60R 22/4628; B60R 2022/4642
USPC ............................ 242/374; 60/632
See application file for complete search history.

(56) References Cited

U.S. PATENT DOCUMENTS

| | | | |
|---|---|---|---|
| 4,444,010 A | 4/1984 | Bendler | |
| 5,881,962 A | 3/1999 | Schmidt et al. | |
| 7,887,095 B2 | 2/2011 | Bieg et al. | |
| 8,042,835 B2 | 10/2011 | Bieg et al. | |
| 8,371,613 B2 * | 2/2013 | Hodatsu | B60R 22/4628 242/374 |
| 8,393,644 B2 | 3/2013 | Lee | |
| 2001/0035472 A1 * | 11/2001 | Hamaue | B60R 22/4628 242/374 |
| 2013/0327872 A1 | 12/2013 | Gentner et al. | |
| 2013/0327873 A1 | 12/2013 | Gentner et al. | |
| 2014/0014758 A1 | 1/2014 | Gentner et al. | |

FOREIGN PATENT DOCUMENTS

| | | |
|---|---|---|
| DE | 102006031359 A1 | 10/2007 |
| DE | 102006031360 A1 | 10/2007 |
| DE | 102010054845 A1 | 3/2013 |
| WO | 2012065655 A1 | 5/2012 |
| WO | 2012065656 A1 | 5/2012 |
| WO | 2013156122 A1 | 10/2013 |

OTHER PUBLICATIONS

Jon Burrow et al., U.S. Appl. No. 12/830,792, Entitled High Seal Retractor Pretensioner Piston, filed Jul. 6, 2010, 25 pages.
Gunter Clute, U.S. Appl. No. 11/115,583, Entitled Pretensioner Device for a Seatbelt Retractor, filed Apr. 27, 2005, 20 pages.

* cited by examiner

*Primary Examiner* — Sang Kim
(74) *Attorney, Agent, or Firm* — Brinks Gilson & Lione (57) ABSTRACT

A pretensioner assembly for motor vehicle belt restraint systems is provided. The pretensioner assembly includes a tube in fluid communication with a gas generator and a driving element disposed therein that travels in a first direction in response to actuation of the gas generator. The tube includes a constriction disposed adjacent an exit of the tube. The constriction allows the driving element to pass but prevents a seal member disposed between the generator and the driving element from passing. The constriction provides backpressure on the seal member causing the seal member to expand radially outward. The system can also include a slug member disposed between the seal member and the driving element.

20 Claims, 11 Drawing Sheets

RETRACTOR PRETENSIONER ASSEMBLY

FIELD OF THE INVENTION

The present invention relates generally to seatbelt restraint devices for restraining an occupant of a vehicle, and more particularly, to devices for pretensioning a seatbelt.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either prior to an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt. Various designs of retractor pretensioners presently exist, including a type known as a roto-pretensioner that incorporates a gas generator for generating a pyrotechnic charge. Examples of such roto-pretensioners are described in U.S. Pat. No. 5,881,962, filed Apr. 11, 1995, U.S. patent application Ser. No. 11/115,583, filed Apr. 27, 2005, and U.S. patent application Ser. No. 12/830,792, filed Jul. 6, 2010, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack and pinion, or series of balls disposed in a pretensioner tube, which engage with and wind a retractor spool sprocket to retract the webbing.

One issue with pretensioners using a series of metallic balls is the weight of the series of balls required for a full pretensioning stroke, as well as the corresponding cost of supplying multiple metallic balls with strict tolerances. Further, for pretensioners using a series of metallic balls, or rack and pinion based systems, is the need for a synchronizing or clutch feature to ensure that the series of balls or pinion sufficiently engage the retractor spool sprocket.

Another issue with pretensioners is known as a low resistance condition, where the driving elements will reach an end of stroke without experience substantial resistance. This can occur if there is excessive slack in the seatbelt webbing. In these cases, the low resistance results in a lower amount of backpressure from the driving elements. The backpressure is produced by the engagement between the driving elements and the sprocket, so lower backpressure reduces the pressure on a sealing element that trails the driving elements. Reduced pressure on the sealing elements reduces the amount that the sealing element is compressed circumferentially. Reduced sealing ability can cause gas to leak from the tube around the series of balls.

A further issue with pretensioners is the need to maintain the retractor and the seatbelt webbing in a locked condition at the end of the pretensioning stroke. When the retractor spool does not remain locked, payback can occur which allows the seatbelt to unspool and reintroduce slack in the seatbelt. One method for maintaining the locked position includes maintain pressure from the gas generator beyond the amount needed for the pretensioning stroke. However, this adds weight and cost.

BRIEF SUMMARY OF THE INVENTION

The present invention provides a seatbelt pretensioning retractor assembly. The assembly includes a housing adapted for being mounted to a vehicle structure; a tube having an arcuate and curved shape having a first end in fluid communication with a gas generator and a second end in fluid communication with an interior cavity of the housing; a sprocket rotatably mounted to the housing and fixedly coupled to a spindle adapted for taking up seatbelt webbing during pretensioning, the sprocket having a plurality of vanes; at least one driving element disposed within the tube and translatable through the tube in a first direction toward the sprocket in response to an actuation by the generator; and a seal member disposed between the generator and the at least one driving element. The tube includes a constriction portion having an opening smaller than the width of adjacent portions of the tube and disposed adjacent the exit. The constriction portion is sized to permit the driving element to pass therethrough and to prevent the seal member from passing therethrough.

In another aspect of the invention, the assembly includes a slug member disposed between the seal member and the driving element. The constriction prevents the slug member from passing therethrough.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION OF THE INVENTION

The following description is merely exemplary in nature and is not intended to limit the present disclosure or its application or uses.

Figure 1:
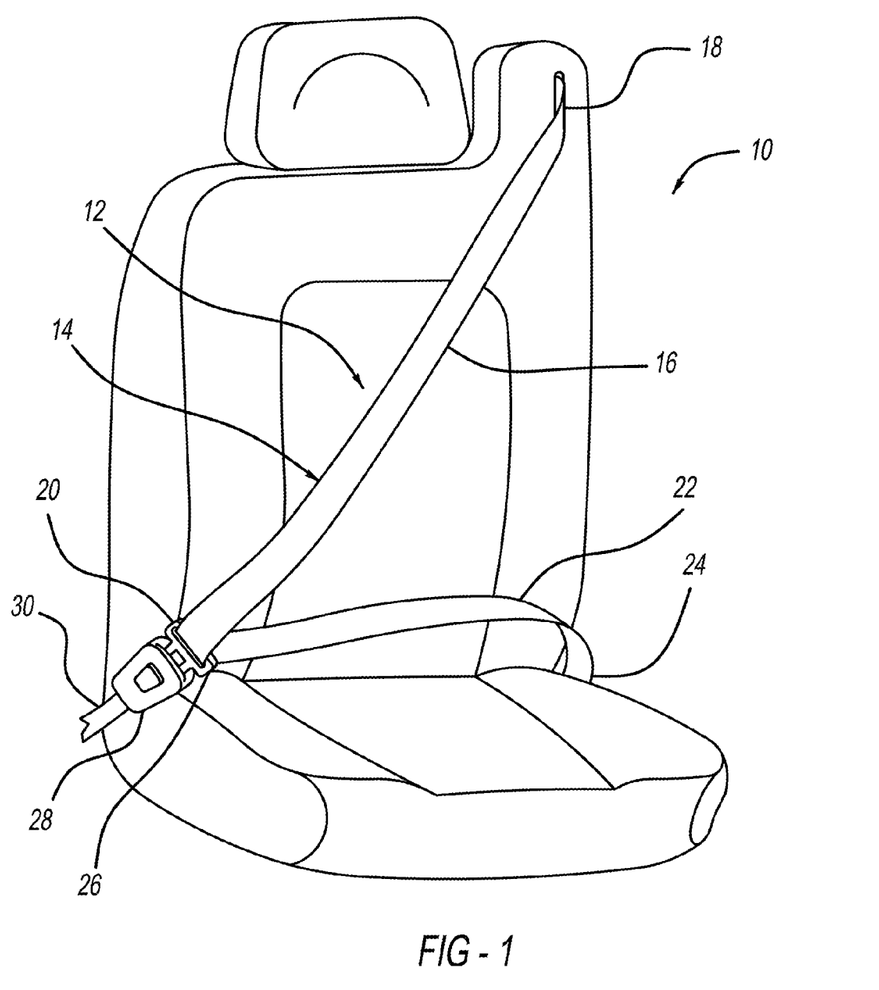
FIG. 1 is perspective view of an occupant restraint system.

Referring now to the drawings, FIG. 1 shows a vehicle seat 10 and a seat belt assembly 12. The seat belt assembly 12 includes a seat belt webbing 14 having a shoulder belt portion 16 extending from an upper guide loop or anchorage 18 to a latch plate 20 and a lap belt portion 22 extending from the latch plate 20 to an anchorage 24. The latch plate 20 can include a loop portion 26 through which the webbing 14 extends. The latch plate 20 is able to be inserted into a seat belt buckle 28 to lock and unlock the seat belt assembly 12. A seat belt buckle cable 30, either directly or in cooperation with other components, secures the seat belt buckle 28 to a portion of the vehicle frame. It will be appreciated that other manners of attaching the seat belt webbing 14 to vehicle could also be used, including variations on the latch plate 26 and the buckle 28 and their attachments to the webbing 14 and associated vehicle structure.

The seat belt webbing 14 is able to pay-out from a retractor 32 assembly (shown in FIGS. 2 and 3), which is located within the vehicle seat 10 (in an integrated structural seat design) or is coupled structurally to the vehicle body, so that the effective length of the seat belt webbing 14 is adjustable. When the buckle latch plate 26 has been fastened to the seat belt buckle 28, the seat belt assembly 12 defines a three-point restraint between the upper anchorage 18, the buckle latch plate 26, and the anchor point 24. Any other suitable configurations, such as alternative locations for the retractor assembly 32, the buckle latch plate 26, and the anchor point 24, may be used with the present invention.

Figure 2:
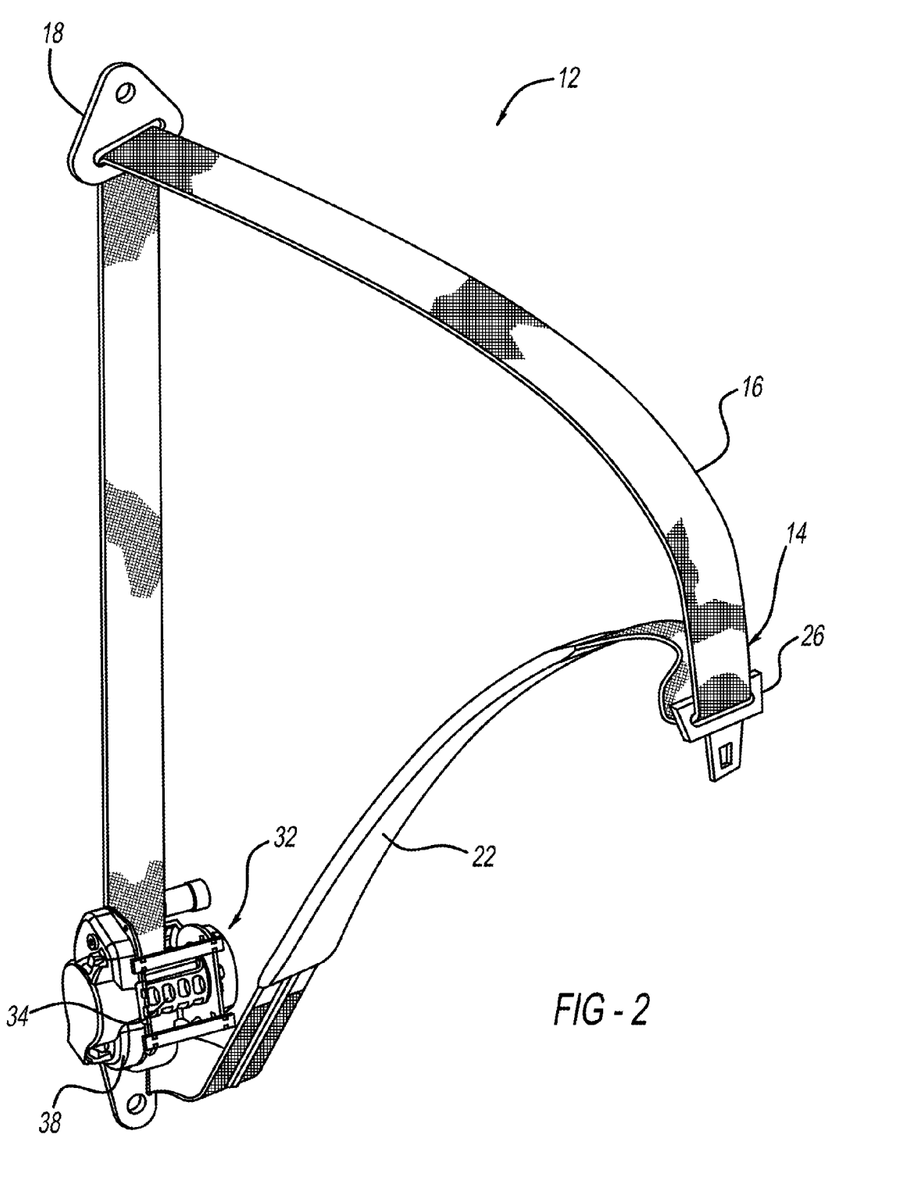
FIG. 2 is a perspective view of the occupant restraint system with various components removed to show a seat belt retractor and pretensioner system.

Now with reference to FIG. 2, an isometric view of the seat belt assembly 12 of the present invention is illustrated disassociated from the motor vehicle and showing the spool retractor assembly 32. The retractor assembly 32 includes a spool assembly 34 and a gas generator 36 mounted to a common frame 38. The spool assembly 34 is connected with and stows the webbing 14 of the shoulder belt portion 16, whereas the end of the lap belt portion 22 of the webbing 14 is fixedly engaged with the anchorage point, for example, the frame 38 or another portion of the motor vehicle such as the seat 10 or floorpan.

Figure 3:
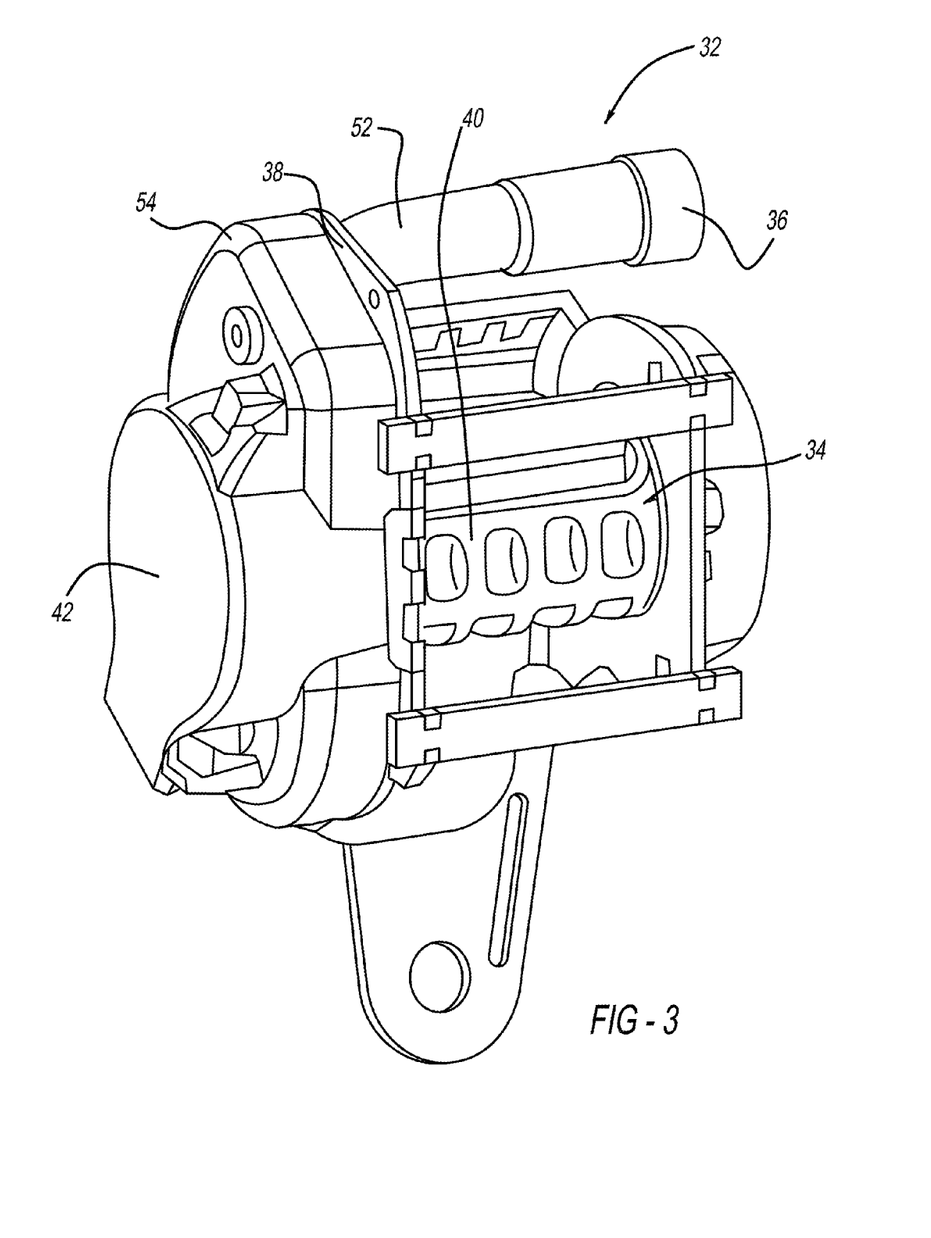
FIG. 3 is a perspective view of the seatbelt retractor assembly.

As best shown in FIG. 3, the spool assembly 34 includes a belt spool 40 which engages the shoulder belt portion 16 of the webbing 14 and rotates to wind-up or pay-out the belt webbing 14. A torsional "clock" or "motor" type spring is carried within a spring end cap 42 and rotationally biases the spool 40 to retract the webbing 14. The spool assembly 34 may further incorporate other spool control mechanisms which are known in accordance with the prior art, including pretensioners, inertia and webbing sensitive locking devices, torsion bar load limiters, or other belt control devices. "Spool control systems" referred to in this specification may include any system which controls the rotational movement of a webbing spool, thus controlling the extraction and retraction of seat belt webbing. One such spool control system is a motor-assisted retractor. Spool locking devices typically incorporate an inertia sensitive element, such as a rolling ball or pendulum, and cause a sprocket of the spool to be engaged to prevent further withdrawing of webbing from the spool 40. Webbing sensitive locking devices sense rapid pay-out of webbing to lock the retractor. Various electronic sensing mechanisms which detect the withdrawal of webbing and/or the connection of the tongue 26 to the buckle 28 may also be incorporated into the retractor assembly 32.

During normal operation of the vehicle, the retractor assembly 32 allows pay-out of seat belt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate or if the brakes are actuated with a predetermined force, then the retractor assembly 32 is locked. Due in part to the free pay-out of the seat belt webbing 14, the seat belt assembly 12 often develops slack during normal use.

The retractor assembly 32 further incorporates a pretensioner system 44 (shown in FIG. 4) operatively connected to the spool assembly 34 and operable to rotate the spool 40 for pretensioning. As known to those of skill in the art, a retractor pretensioner winds seat belt webbing into a more taught condition against the occupant at the initial stages of a detected vehicle impact. This is provided to reduce forward motion or excursion of the occupant in response to the deceleration forces of a vehicle impact or rollover.

The pretensioner system 44 includes a pretensioner tube 52 in communication with the gas generator 36. The gas generator 36 is used to provide expanding gas in response to a firing signal. As is known in the art, for example, the vehicle includes a sensor array sending a signal indicative of an emergency event such as an impact event, crash, or rollover. The vehicle sensor may be a specific impact sensor, or may be a traditional vehicle sensor (e.g. a longitudinal or lateral acceleration sensor) or otherwise part of a control system having a suite of multiple sensors. Any other impact sensor that is or will be known to those skilled in the art may also be readily employed in conjunction with the seat belt assembly 12 of present invention. An electronic control unit such as a central processing unit (CPU) or other controller receives a signal and controls the seat belt assembly 12 to respond by tightening the seatbelt of the vehicle (e.g. via activation of a pretensioner).

Figure 4:
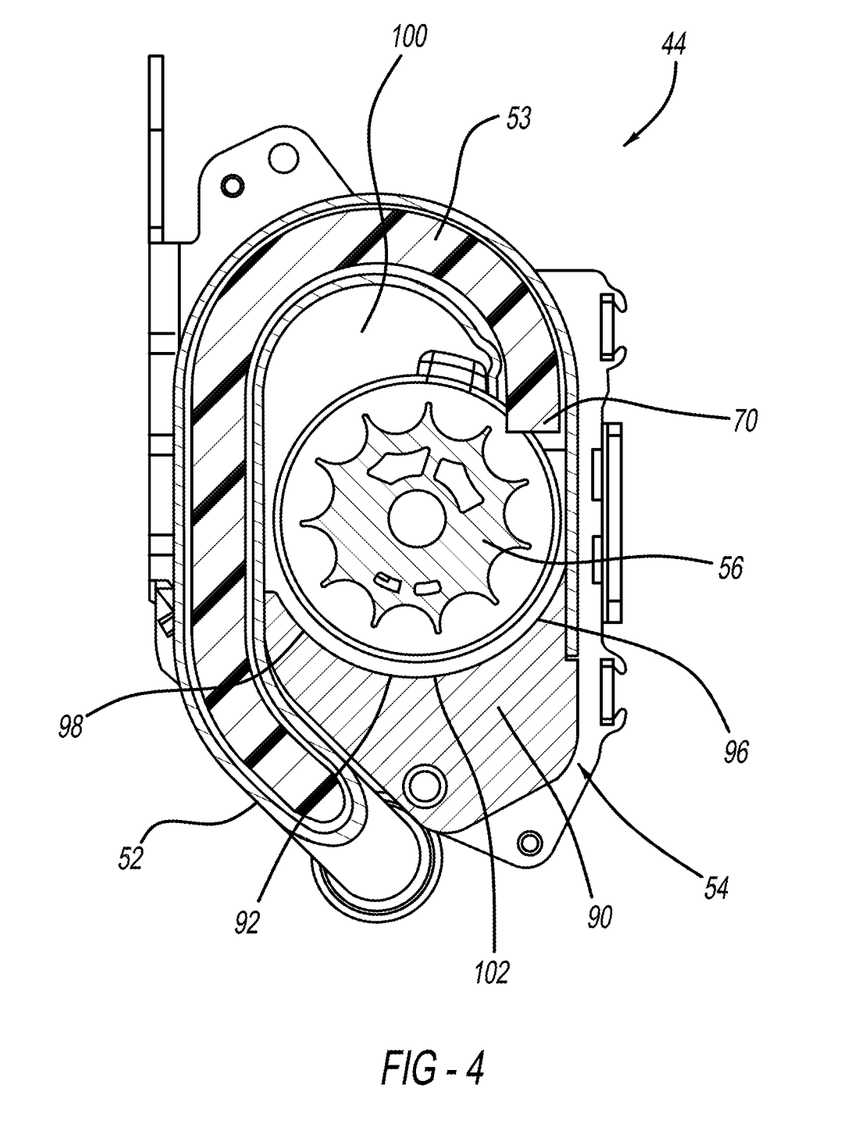
FIG. 4 is a cut-away view of the pretensioner system illustrating a tube, a rod, and a sprocket in a first, non-actuated position.

FIG. 4 provides a cut-away illustration of the pretensioner system 44. The pretensioner tube 52 has a pretensioner rod 53 disposed therein (also shown in FIG. 5) that has an elongate shape and is flexible within the tube 52. More specifically, the rod 53, when disposed outside of the pretensioner tube 52 prior to insertion therein, has a generally straight shape, and when inserted into the tube 52 it will bend and flex in accordance with the tortuous shape of the tube 52.

Turning now to the retractor assembly 32, the assembly 32 includes the spool assembly 34 mounted to the common frame 38, as described above. More particularly, the spool assembly 34 will rotate relative to the common frame 38 to wind the webbing 14 attached to the spool assembly 34. The common frame 38 includes a housing 54 for housing the components of the pretensioner system 44.

The spool assembly 34 includes a sprocket 56 that is disposed within the housing 54. The sprocket 56 is attached to the belt spool 40. Rotation of the sprocket 56 will cause the attached belt spool 40 to rotate to wind the webbing 14 that is attached to the belt spool 40.

Figure 5:
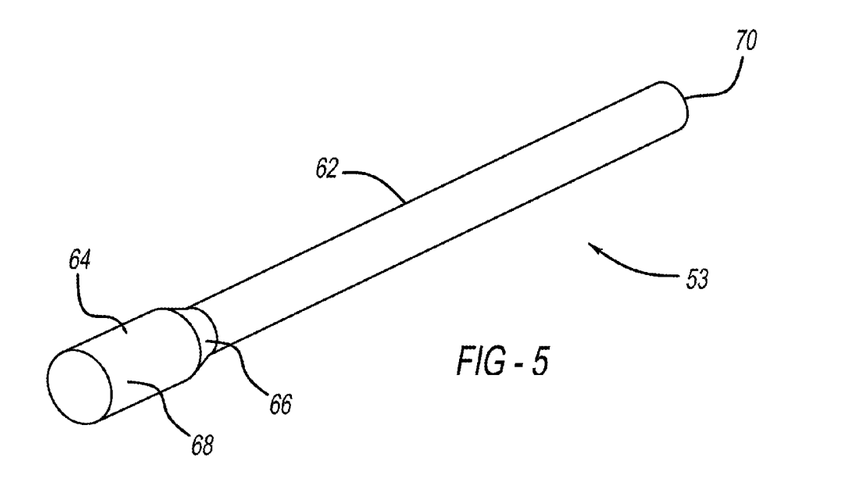
FIG. 5 is a perspective view of the rod.

As shown in FIG. 5, the rod 53 has a generally circular cross-section in one form. In another approach, the rod could have a non-circular cross-section, such as a rectangular cross-section, triangular cross-section, or other polygonal cross-section that allows the rod 53 to be inserted into the tube 52 and adapt to the tortuous shape of the tube 52 when inserted. The polygonal cross-section could rotate along the length of the rod 53 to create a spiral shape, in one approach. Additionally, or alternatively, the rod 53 could include protrusions, such as longitudinal rails or circumferential rings, or recesses, such as longitudinal or circumferential grooves.

The rod 53 preferably includes a main body portion 62 that extends along a majority of its overall length. The rod 53 further includes an enlarged portion 64 at one end. In one form, the enlarged portion 64 is in the form an enlarged diameter, but could also be in the form of an enlarged perimeter for a rod having a polygonal cross-section. For purposes of discussion, the rod 53 will be discussed as having a circular cross-section, such that the enlarged portion 64 is in the form of an increased diameter.

The rod 53 further includes a tapered portion 66 that extends between the main body portion 62 and the enlarged portion 64, such that there is a gradual transition between the main body portion 62 and the enlarged portion 64. It one approach, the tapered portion 66 is in the form of a straight taper, such that a longitudinal cross-section of the tapered portion 66 would illustrate a constant slope. In another form, the tapered portion 66 could have a curved shape, such as a convex shape facing outward from the rod 53, or a concave shape facing outward. In another approach, the tapered portion 66 could have a complex curvature having both a convex and concave curvature.

The rod 53 includes a proximal end 68 that is disposed toward the gas generator 36 when the rod 53 is installed within the pretensioner system 44. The rod 53 further includes a distal end 70 that is disposed at the opposite end of the rod 53 from the proximal end 68, with the enlarged portion 64 disposed at the proximal end 68.

The rod 53 is preferably made from a polymer material, which has a reduced weight relative to metallic ball driving elements of other roto-pretensioners. The particular polymer material can be selected to fit the particular desires of the user. The polymer material is preferably one that has sufficient flexibility such that it can bend and flex through the tube 52 to allow for initial installation as well as in response to actuation by the gas generator 36. The polymer material is preferably one that has sufficient pushability in response to actuation, such that the rod 53 will sufficiently transfer a load to a sprocket 56 of the pretensioner system 44.

Further, the rod 53 is preferably made from a polymer material that is plastically deformable. During and after actuation, the rod 53 will be become plastically deformed in response to actuation and contact with other components of the pretensioner system 44. This plastic deformation will be further discussed below with reference to the use of the system 44, where the plastic deformation will cause the system to become locked to prevent or limit payback of the rod 53 without being completely dependent on maintained pressure in the system.

In one approach, the rod 53 is made from a nylon thermoplastic material. The rod 53 could also be made from a aliphatic polyamide thermoplastic material. In another approach, the rod 53 could be made from a similar thermoplastic material, such as an acetal material or polypropylene material.

It will be appreciated, however, that other materials for the rod 53 could also be used that can activate the pretensioner 44 without plastic deformation. For example, and elastically deformable material could be used, but such a material would not provide each of the advantages of a plastically deformable rod.

Figure 6:
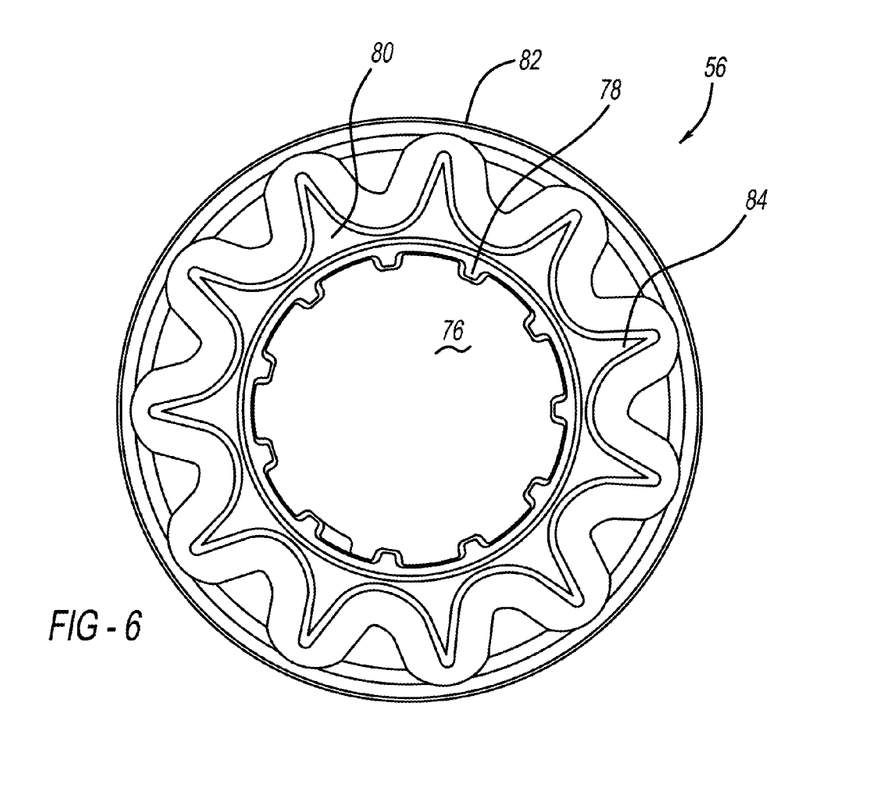
FIG. 6 is a plan view of the sprocket having a plurality of vanes.
Figures 7, 8:
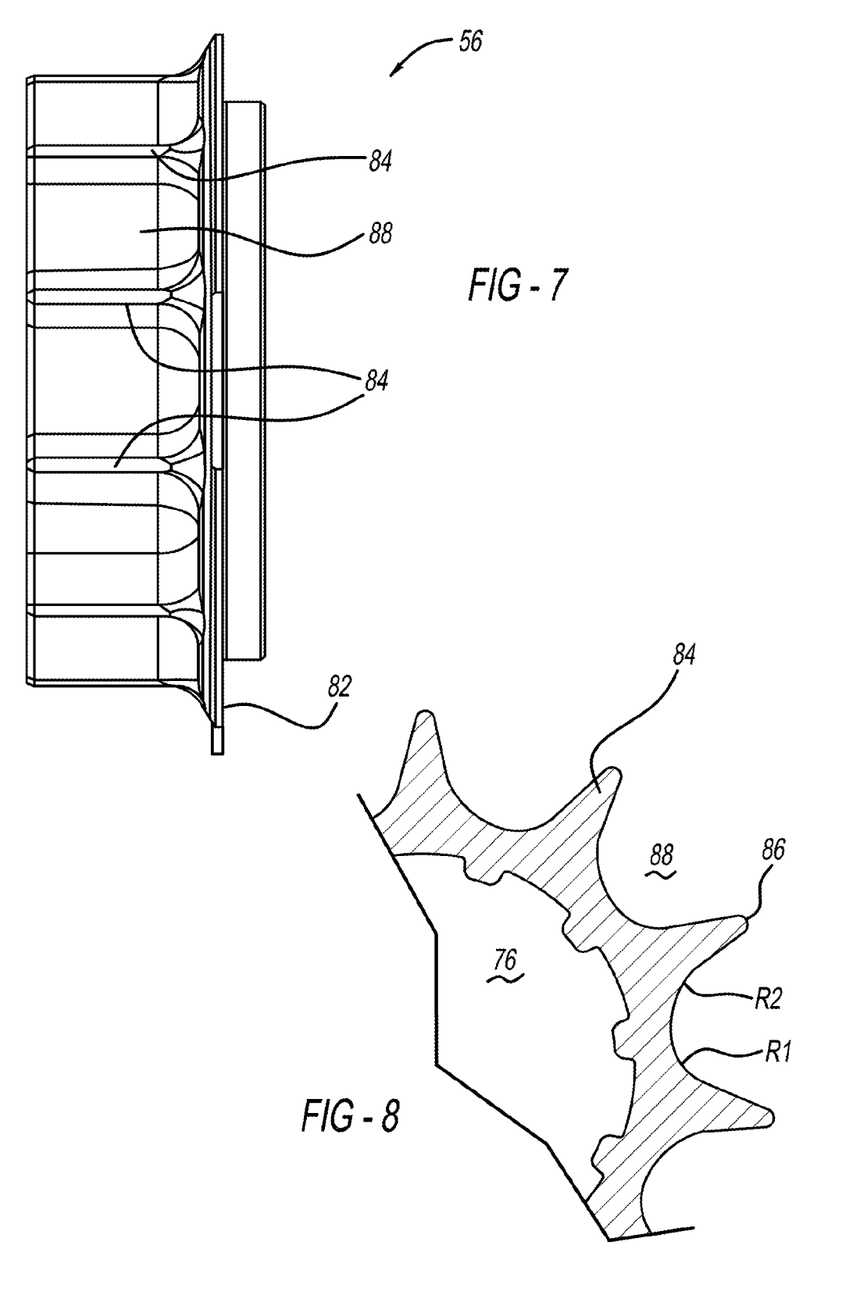
FIG. 7 is a side view of the sprocket.
FIG. 8 is a partial view of the sprocket illustrating the shape of the vanes.

With reference to FIGS. 6-8, the sprocket 56 has a general annular shape that defines an internal aperture 76. The sprocket 56 further defines a plurality of inward extending teeth 78 that extend into the aperture 76. The teeth 78 are sized and configured to correspond to recesses or depressions that are defined on an external surface of the belt spool 40 to connect the sprocket 56 to the belt spool 40 such that they are rotationally coupled. In another approach, the aperture could include a single tooth or protrusion to rotationally couple the sprocket 56 to the belt spool 40.

The sprocket 56 includes an annular body portion 80 and a flange portion 82 that projects radially from the base of the body portion 80. The sprocket 56 further includes a plurality of vanes 84 that each project radially from body portion 80 as well as longitudinally from the flange portion 82, such that vanes 82 extend between the body portion 80 and flange portion 82.

The vanes 84 each have a generally triangular shape when viewed from the front, with a base that tapers into a point 86 as the vane 84 extends radially outward from the body portion 80. The particular width and pitch of the vanes 84 can be selected as desired. The plurality of vanes 84 combine to define cavities 88 that are disposed between adjacent vanes 84.

In one approach, each of the vanes 84 can have the same size and shape and be uniformly distributed around the sprocket 56. In another approach, the vanes 84 can have different sizes and/or be spaced at different intervals. Adjusting the size and spacing of the vanes 84 can alter the amount of rotation and/or the rate of the rotation for the sprocket 84 when the pretensioner system 44 is activated. This variable size and/or spacing is possible due to the actuation by the rod 53 rather than by a series of similarly shaped balls. In a pretensioner that uses a plurality of ball-shaped driving elements, the size and spacing is preferably uniform to account for the predetermined shape and size of the balls.

In one preferred approach, the sprocket 56 includes 11 vanes 84. The vanes 84 each have a height of 5.55 mm, and the cavities 88 accordingly have the same depth. The vanes 84 are evenly spaced around the diameter of the sprocket 56 with a spacing of approximately 32.73 degrees. The vanes 84 have a taper angle of 30 degrees. The point 86 has an outer radius of 0.45 mm. Of course, other sizes could also be used.

In one approach, the cavities 88 have a complex curvature at their base. In this approach, the inner radius of the cavity 88 has two measurements. A first radius R1 is 2.8 mm, and a second larger radius R2 is 4.3 mm. Accordingly, the corresponding vanes 84 have different lengths of its sidewalls that remain straight before leading into the curve of the base of the cavity 88.

The longer sidewall of the vane 84 on one side is directed toward the rod 53 when the rod 53 is disposed within the tube 52. Accordingly, when the rod 53 travels toward the sprocket 56, the rod 53 will contact the longer sidewall. One the opposite side of the vane 84, the sidewall is shorter because it will not directly contact the end of the rod 53. Instead, the shorter sidewall and larger radius that it leads into will result in a wider and more robust base of the vane 84, thereby adding greater resistance to deformation in response to the force from the rod 53. This particular arrangement allows for a large landing area of the rod 53 while maintaining a resistance to deformation.

With reference once again to FIG. 4, the housing 54 further include a guide portion 90. The guide portion 90 is disposed within the housing 54 similar to the sprocket 56. More particularly, the guide portion 90 is disposed opposite the exit of the tube 52, and the sprocket 56 is disposed between the guide portion 90 and the tube 52. Accordingly, the rod 53 exiting the tube 52 will contact the sprocket 52 prior to contacting the guide portion 90.

The guide 90 has a generally arcuate landing surface 92 that has a concave shape toward the exit of the tube 52. In one approach, the arc of the surface 92 has a constant radius. Further, the centerpoint of the radius of the arc is aligned with the rotational axis of the sprocket 56, such that the radial spacing between the surface 92 and the sprocket 56 is consistent along the length of the surface 92. In another approach, the centerpoint of the radius of the surface could be offset from sprocket axis, such that the radial spacing between the surface 92 and the outer diameter of the sprocket 56 will vary at different points along the surface 92.

The surface 92 includes a first end 96 and second end 98. The first end 96 is disposed opposite the exit of the tube 52 such that the rod 53 would engage the first end 96 prior to the second end 98 after exiting the tube 52 and passing the sprocket 56.

The housing 54 further defines an overflow cavity 100 that is disposed opposite the guide 90. The overflow cavity 100 is also disposed adjacent the curvature of the tube 52, and the sprocket 56 is disposed between the guide 90 and the overflow cavity 100. Accordingly, an intermediate portion 102 of the guide 90 is diametrically opposite the overflow cavity 100 across the sprocket 56.

The overflow cavity 100 is sized and configured to allow a portion the rod 53 to be received therein during actuation of pretensioner system 44, if necessary. For example, after the rod 53 has exited the tube 52 it will contact the guide 90 and be directed in an arcuate path corresponding to the guide 90, such that the rod 53 is ultimately directed toward the overflow cavity 100. The rod 53 can extend into the overflow cavity 100, and can further be guided along the curvature of the tube 52 that is adjacent the overflow cavity 100. However, it will be appreciated that the rod 53 may not necessarily travel far enough during actuation to ultimately reach the overflow cavity 100.

As described above, the retractor assembly 32 includes the gas generator 36 that provides expanding gas in response to a firing signal. The expanding gas causes an increase in pressure within the tube 52, which ultimately causes the rod 53 to be forced away from the gas generator 36 and through the tube 52.

Figure 9:
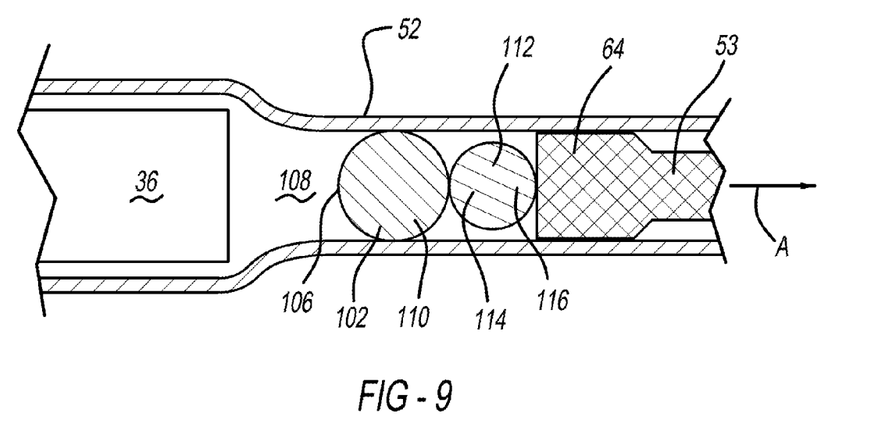
FIG. 9 is a cross-sectional view of a gas generator, a seal, a slug, and the rod of the pretensioner system in the first, non-actuated position.
Figure 10:
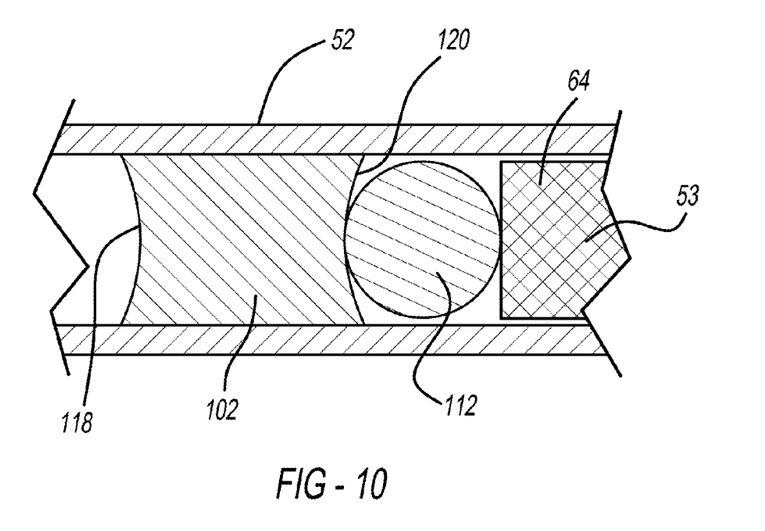
FIG. 10 is a cross-sectional view of an alternative embodiment of the seal and slug.

More particularly, as shown in FIG. 9, the pretensioner tube 52 includes a piston or seal 102. The seal 102 can have a spherical shape with a spherical outer surface, in one approach. In another approach, the seal 102 can have a generally cylindrical shape with a cylindrical outer surface, as best shown in FIG. 10. The seal 102 is slidably disposed within the tube 52 and is operable to drive the rod 53 along an actuating path A. As will be understood by those of skill in the art, the seal 102 may be press-fitted or otherwise fitted inside the tube 52.

As shown in FIG. 9, the seal 102 defines a proximal end 106 spaced from the gas generator 36 so as to define a gas chamber 108 therebetween. The seal 102 defines a distal end 110 directed toward the rod 53.

In one approach, the pretensioner tube 52 includes a stopper ball or slug 112 disposed within the tube 52 between the seal 102 and the rod 53. The slug 112 is preferably made from aluminum, but could be made from another suitable material of sufficient strength, such as steel or reinforced plastic. The slug 112 has a generally spherical shape in one approach. However, the slug 112 could have an ovular shape or generally cylindrical shape in other approaches. The slug 112 defines a proximal end 114 that is adjacent the distal end 110 of the seal 102, and a distal end 116 that is adjacent the rod 53.

In one approach, the seal 102 and slug 112 are two separate and distinct components. In another approach, the slug 112 could be integrated into the seal 102 such that are fixed to each other. In this approach, the slug 112 preferably has the same material strength as described above, with the seal 102 being generally softer such that it can provide the described sealing abilities. In this approach, the seal 102 and slug 112 are fixed via an adhesive, welding, mechanical connections, or the like.

The seal 102 and slug 112 cooperate to transfer the energy from the increased pressure in the gas chamber 108 toward the rod 53. The rod 53, in order to travel through the tube 52 and flex according to the curvature of the tube 52, is sized slightly smaller than the width of the tube 52. Thus, without the seal 102, gas from the gas generator would flow past the rod 53 in the space defined between the rod 53 and the tube 52.

The seal 102 and slug 112 are sized to cooperate in a coupled manner. In one approach, shown in FIG. 10, the proximal end 106 and the distal end 110 of a seal 102' having a cylindrical shape are each indented inward so as to define semi-spherical recesses or concave depressions 118 and 120. In this approach, the proximal end 114 of the slug 112 has a convex shape, such as the slug 112 having a spherical or ovular shape. Of course, the slug 112 could be shaped similar to a bullet with the distal end 118 having a generally flat shape.

Figure 11:
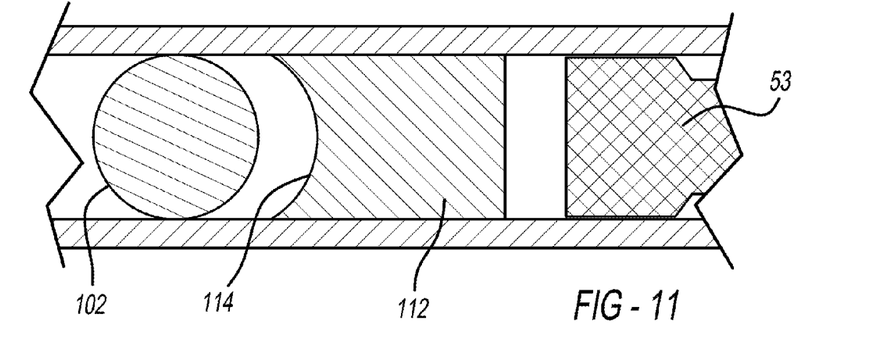
FIG. 11 is a cross-sectional view of an alternative embodiment of the seal and slug.

In another approach, shown in FIG. 11, the seal 102 could have a spherical shape, and the slug 112 could have a concave shape at its proximal end 114. In another approach, the distal end 110 of the seal 102 and the proximal end 116 of the slug 112 could both have convex shapes, as shown in FIG. 9, with the contact between the seal 102 and slug 112 occurring at a focused area where the convex shapes meet.

As will be discussed in greater detail below, the seal 102 defines a generally elastic structure, and may be composed of various materials known in the art, such as any suitable plastic or polymer (e.g., polyester, rubber, thermoplastic, or other elastic or deformable material). Moreover, the seal 102 may be die cast, forged, or molded from metal, plastic, or other suitable material. In one aspect of the present invention, the seal 102 may be formed using a two-cavity injection molding process. The generally elastic structure allows the shape of the seal 102 to change slightly in response to pressure, thereby improving the sealing that it provides.

In operation, the gas generator 36 produces expanding gas that pressurizes the gas chamber 108, thereby enabling the seal 102 to forcibly drive the rod 53 along the actuation path A. As the rod 53 driven through tube 52, it engages the sprocket 56. More particularly, the rod 53 engages the vanes 84 of the sprocket 56. Engagement of the rod 53 with the sprocket 56 as the rod 53 is driven by expanding gas in the direction of arrow A causes the spool 40 to rotate, which in turn provides pretensioning. Of course, it should be understood that while the pretensioner system 44 employs the rod 53 for rotating the spool 40, the pretensioner system 44 may use alternative driving elements known in the art, such as a plurality of balls or another type of flexible and pushable rod.

Activation of the gas generator 36 enables the seal 102 to resist gas leakage. As previously mentioned, the seal 102 is composed of a relatively elastic material. Therefore, pressurized gas within the gas chamber 108 causes the proximal end 106 of the seal 102 to expand, which helps prevent gas from escaping past the seal 102. In one approach, when the seal 102 has a cylindrical shape, the seal 102 includes a flexible rim that expands circumferentially outward in response to pressurized gas.

In addition, backpressure generated from the rod 53 causes the seal 102 to expand circumferentially outward due to compression of the seal 102 against the slug 112 and the rod 53. The rod 53 undergoes resistance as it engages the sprocket 56 during actuation, thereby generating backpressure on the slug 112 and the seal 102. This occurs regardless of the shape of the slug 112 and seal 102. In the case where the seal 102 has a cylindrical shape, a distal rim defined by the seal 102 will also expand radially outward. The circumferential expansion of the seal 102 provides a tightened seal between the outer surface of the seal 102 and the inner wall of the pretensioner tube 52. Accordingly, the seal 102 of the present invention is operable to retain a high seal pressure as well as maintain residual gas pressure within the tube 52.

During actuation of a pretensioner and during pretensioning of the seatbelt there can be a side-effect known as payback, where the tension on the seatbelt from caused by the occupant during an event triggering pretensioning can rotate the spool in a direction opposite the pretensioning rotation. This rotation is transferred to the sprocket and driving elements, causing the driving elements to travel in the reverse direction within the tube. Payback can be counteracted by maintaining pressure in the tube, but this requires the gas generator to fire for a longer period and additional propellant.

However, a preferred embodiment of the pretensioner system 44 described herein includes features configured to counteract the above described payback side-effect as an alternative to or in addition to maintained gas pressure. As described above, the rod 53 is preferably made of a plastically deformable material, such as a polymer.

Figure 12:
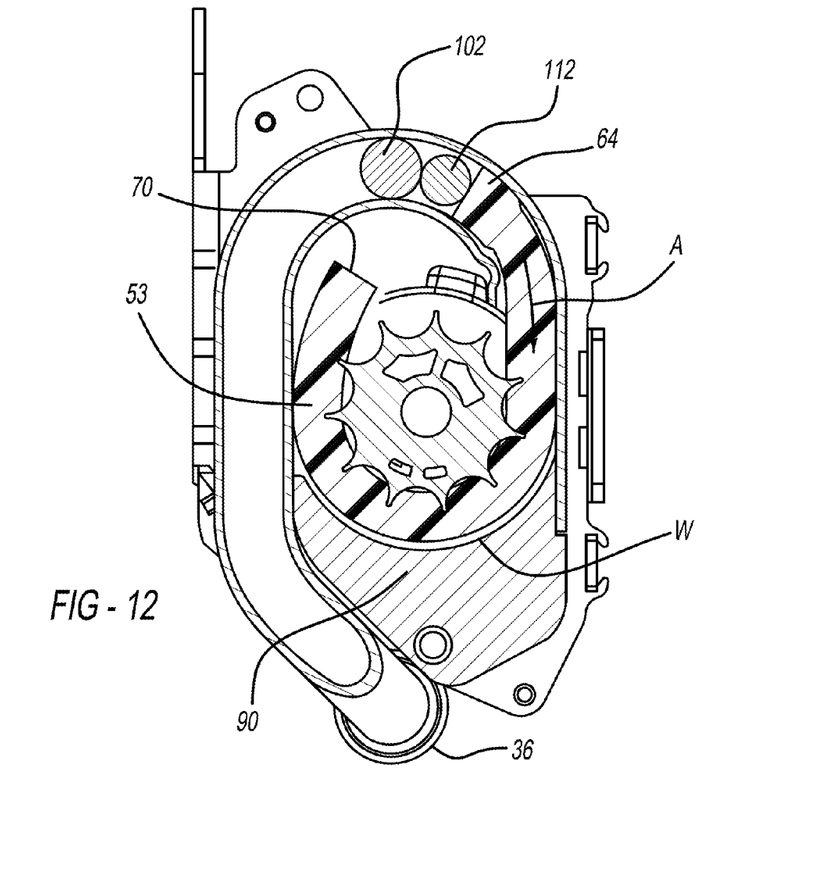
FIG. 12 is a cross-sectional view of the pretensioner system in an actuated position.

With reference to FIG. 12, during actuation of the pretensioner system 44, the rod 53 exits the tube 52 and contacts the vanes 84 of the sprocket 56, causing the sprocket 56 to rotate. As the rod 53 continues past the sprocket 56 causing it to rotate, additional ones of vanes 84 will contact the side of the rod 53, causing the rod to be compressed and deformed plastically in the area of interference between the vanes 84 and the rod 53. This compression will also cause the rod 53 to be compressed against the guide 90, creating a press-fit configuration of the rod 53 between the sprocket 56 and the guide 90.

Additionally, the rod 53 and guide 90 are made from materials that will weld together at the end of the pretensioning stroke. For example, the materials of the rod 53 and guide 90 are selected such that heat generated from the friction between the rod 53 and the guide 90 will cause the rod 53 and guide 90 to become welded together along an interface W where the guide 90 and rod 53 contact each other. Once the rod 53 and guide 90 are welded together, the rod 53 will become locked and prevented or substantially limited from traveling back into the tube 52. The plastic deformation of the rod 53 caused by the vanes will prevent or substantially limit the sprocket 56 from rotating in the opposite direction, thereby preventing or substantially limiting payback.

The welding results from the relatively high heat and pressure generated by the system during actuation. For the rod 53 and guide 90 to weld, the materials used for each are preferably in the same family. For example, if the guide 90 is nylon, then the rod 53 is preferably nylon. Similarly, if the guide 90 is acetal, then the rod 53 is preferably acetal. If the guide 90 is polypropylene, then the rod 53 is polypropylene. It will be appreciated that other materials that will weld together under high heat and pressure could also be used. Moreover, it will be appreciated that some different types of materials can weld together.

Figures 13, 14, 15:
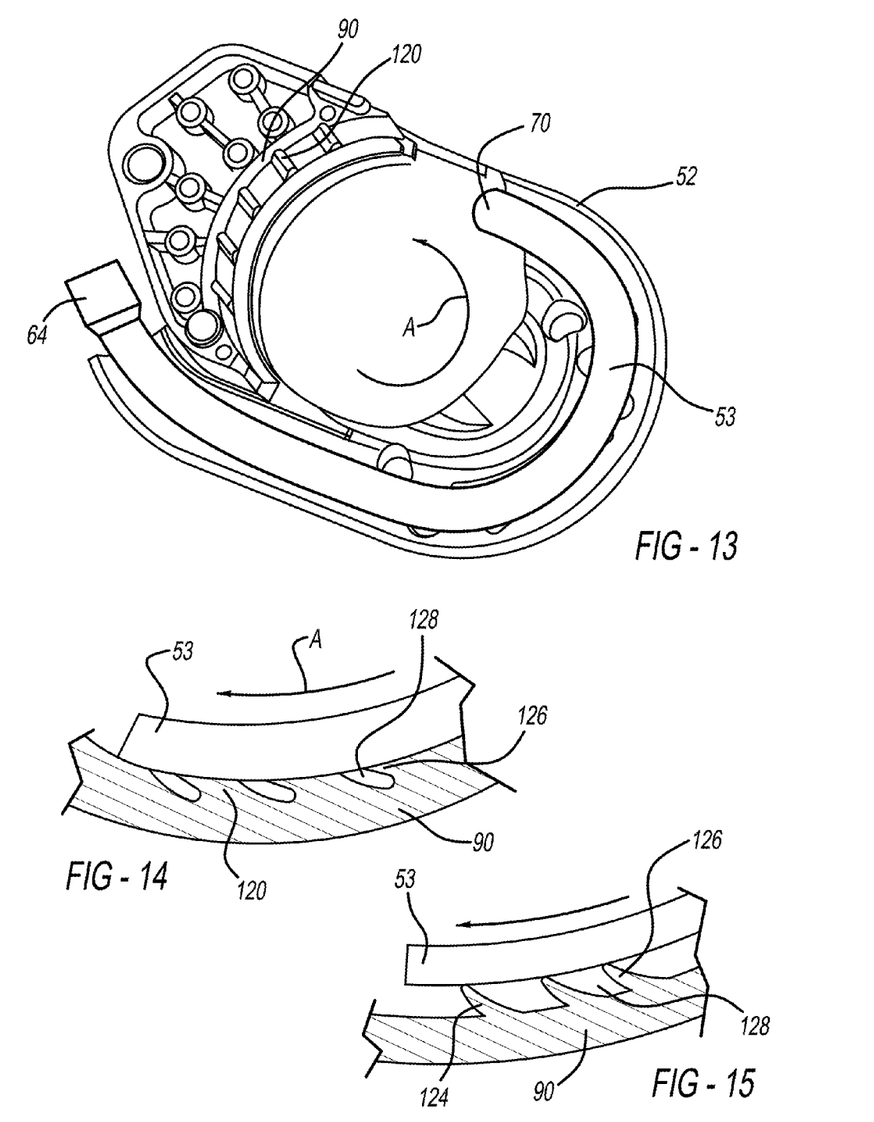
FIG. 13 is a cut-away perspective view of a housing of the pretensioner system illustrating one-way teeth for locking the rod after actuation.
FIG. 14 is a cross-sectional view of one embodiment of the one-way teeth.
FIG. 15 is a cross-sectional view of another embodiment of the one-way teeth.
Figure 16:
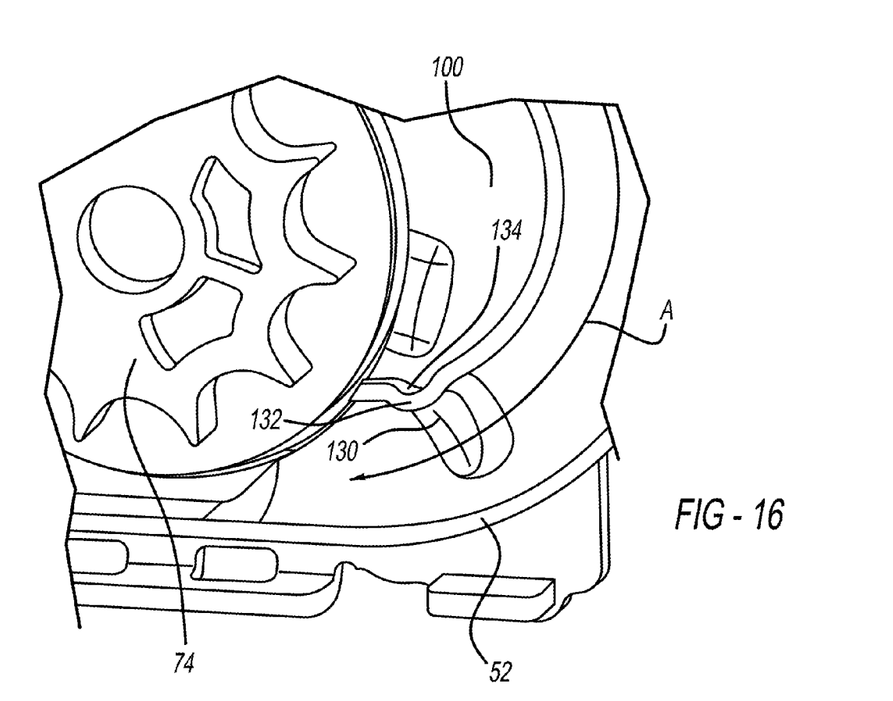
FIG. 16 is a cut-away perspective view of a constriction in the tube of the pretensioner system.

With reference to FIG. 13-15, additionally, or alternatively, the guide 90 can include a plurality of one-way teeth 120 formed on the surface of the guide 90. In one approach, the teeth 120 can be defined by depressions 122 formed in the the guide 90, as shown in FIG. 14. In another approach, the teeth 120 can be in the form of protrusions 124 extending from the guide 90, as shown in FIG. 15. In both instances, the teeth 120 are oriented in a direction to allow the rod 53 to travel past the teeth 120 during the pretensioning stroke, while limiting the rod 53 from traveling in the opposite direction, thereby preventing or substantially limiting payback. For example, when the rod 53 travels past one of the teeth 120, it will first pass over ridge or ledge 126, before passing over a gap 128. If the rod 53 is forced rearward, the rod 53 would be forced against the ridge or ledge 126, thereby preventing or limiting the rod 53 from moving in that direction. Furthermore, the plastic deformation of the rod 53 and the compressing force of the sprocket 56 against the rod 53, forcing the rod 53 against the guide 90, will cause portions of the rod 53 to be pushed into the gap 128 formed by the depression 122 or protrusion 124.

The one way teeth 120 can be used along with the welding described above, or could be used as an alternative if the materials selected for the rod 53 and guide 90 will not weld.

It will be appreciated that other one-way mechanisms or structures could also be used in cooperation with the rod 53 to limit payback.

Another side-effect that can occur during pretensioning is known as a low-resistance condition. This can occur when there is a relatively large portion of the webbing that can be taken up or wound by the spool in response to actuating the pretensioner. For example, if there was extra slack in the seatbelt, this slack would be taken up and wound with lower resistance because it would not be acting on the occupant until the slack was taken up. In a low resistance condition, the backpressure of the driving elements, whether in the form of balls or a rod or another suitable driving element, is reduced. Reduced backpressure can result in a reduced ability of the sealing element to expand circumferentially against the inner wall surface of the tube in response to the backpressure. This can occur for any type of piston or seal that is configured to expand circumferentially in response to backpressure as part of its sealing process.

With reference to FIGS. 16-21, to address the side-effect of a low-resistance condition, in one embodiment of the pretensioner system 44, the tube 52 includes a constriction 130 disposed near the end of the tube 52 where the rod 53 exits. Of course, it will be appreciated that the constriction 130 could be used with other embodiments of a pretensioner that use a plurality of balls rather than a rod. Further discussion of the constriction 130 will include references to the rod 53, but it will be appreciated that such references can also apply to other driving element types, such as a plurality of balls, unless otherwise noted.

The constriction 130 is in the form of a protrusion extending into the tube 52, thereby reducing the cross-sectional area of the tube 52 in a distinct location. The constriction 130 is sized such that there is enough space that the rod 53 can travel past the constriction 130, but that the seal 102 and/or slug 112 will be blocked from travelling past the constriction 130. When the constriction 130 blocks the slug 112 and the seal 102, the constriction 130 provides additional backpressure. Accordingly, the seal 102 will circumferentially or radially expand in response to this backpressure, thereby providing an improved seal in low-resistance conditions. This improved sealing will prevent or limit the potential for gas to escape from the tube in low-resistance conditions.

The constriction can be formed in a variety of ways and have a variety of shapes while providing the above described functionality. In one approach, shown in FIG. 16, the constriction 130 is in the form of a bump 132 in the tube 52, such that the sidewall of the tube 52 maintains substantially the same thickness. The bump 132 is integrally formed with the tube as a monolithic structure, at least in the area of the constriction 130. Put another way, the bump 132 is not a separate component or material attached to the tube 52. The bump 132 protrudes into the tube 52, and has a corresponding depression 134 on an outer surface of the tube 52 (facing the overflow cavity 100, for example). The bump 132 has a convex shape within the tube 52 and the depression 134 has a corresponding concave shape facing the overflow cavity 100.

Figure 17:
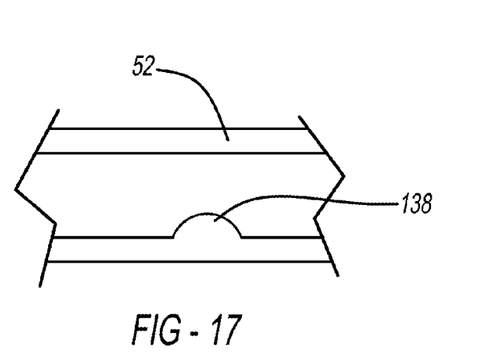
FIG. 17 is a cross-sectional view of another embodiment of the constriction.

In another approach, shown in FIG. 17, the constriction 130 could be in the form of an increased thickness portion 138 that is integral with the tube 52. This is similar to the bump 132, but does not have a corresponding depression on outer surface of the tube 52.

Figure 18:
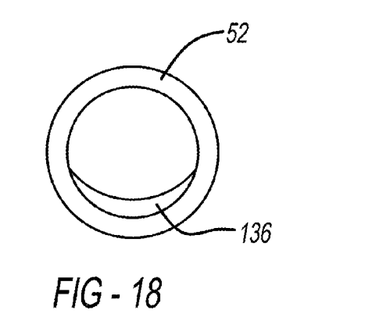
FIG. 18 is a cross-sectional view of another embodiment of the constriction.

In another approach, shown in FIG. 18, the constriction 130 is in the form a separate piece or crescent 136 that is attached to the tube 52 within the tube 52. The crescent 136 can be attached via welding, adhesive, mechanical fasteners, or the like.

Figure 19:
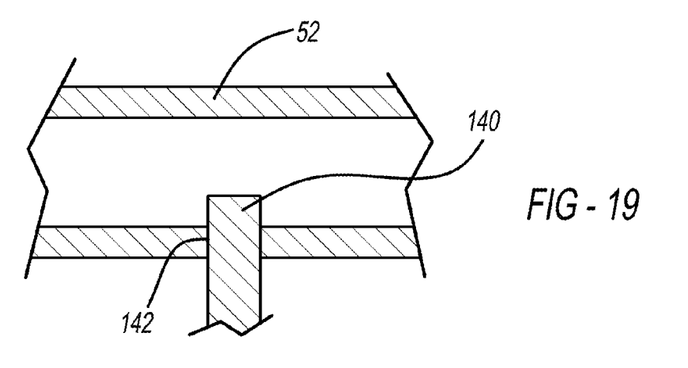
FIG. 19 is a cross-sectional view of another embodiment of the constriction.

In another approach, shown in FIG. 19, the constriction 130 could be in the form of a plate 140 that is inserted through an opening 142 formed in the sidewall of the tube 52. The plate 140 is removably inserted through the opening 142 and secured to the tube 52 via known securement mechanisms. In another approach, the plate 140 can be fixedly secured after insertion through the opening 142. The use of the plate 140 allows for different shapes and sizes and materials to be easily selected and installed, if desired.

In the above approaches, the constriction 130 is preferably disposed on an inboard portion of the tube 52. Disposition of the constriction 130 in this location allows for the rod 53 to slide across the outboard portion of the tube 52 during travel. The centrifugal force of the rod 53 as it travels through the tube 52 will tend to force the rod 53 toward the outboard portion of the tube 52, so locating the constriction on the inboard portion reduces the potential for the constriction 130 to add resistance to the rod 53. This applies to driving elements in the form of a plurality of balls, as well.

The above described constrictions 130 extend into a portion of the circumference of the tube 52. However, a constriction could also extend into the tube 52 around the entire circumference, such as in the form of a circumferential rib.

As described above, the rod 53 has an enlarged portion 64 at its proximal end, where the enlarged portion 64 has a larger diameter than the main body portion 62. In one approach, the enlarged portion 64 has a diameter that is larger than the width of the tube 52 at the constriction 130. Accordingly, with the enlarged portion 64 disposed upstream of the constriction 130, the constriction 130 will prevent it from passing.

In another approach, the enlarged portion 64 can be smaller than the width of the tube 52 at the constriction 130. With the enlarged portion 64 being small enough to pass the constriction 130, it can pass beyond the constriction 130.

Having described the various above embodiments, the general functionality of the system will now be described.

The pretensioner has a first, initial, or nominal state, in which the rod 53 is positioned within the tube 52, as shown in FIG. 4. The enlarged portion 64 of the rod 53 is preferably positioned within the tube 52 adjacent the seal 102 and slug 112. The seal 102 and slug 112 are positioned upstream of the rod 53, with the slug 112 disposed between the seal 102 and the rod 53. The gas generator 36 is attached to the end of the tube 52 so that the gas chamber 108 is defined between the gas generator 36 and the seal 102.

In response to an event or signal that actuates pretensioning, the gas generator 36 will expel gas into the gas chamber 108. The increased pressure within the chamber 108 will force the seal 102, slug 112, and rod 53 away from the gas generator and along the path defined by the tube 52. The distal end 70 of the rod 53 will translate toward the sprocket 56, ultimately contacting one of the vanes 84 of the sprocket 56. The force from the rod 53 exerted against the vane 84 will cause the sprocket 56 to rotate about its rotational axis, thereby ultimately winding the webbing 14 around the spool 40. At this point, the rod 53 is in a second, actuated position, relative to its initial, nominal position. Of course, there are intermediate positions between the first and second positions.

The enlarged portion 64 is initially positioned adjacent the seal 102 and slug 112, as described above. In response to actuation of the gas generator 36, the force of the seal 102 and slug 112 is transferred to the rod 53. This force will cause the proximal end 68 of the rod 53 to be partially deformed in response. If the proximal end of the rod 53 were a smaller diameter, the slug 112 could result in transferring the load to the rod 53 in an off-center position, resulting in a loss of force. Thus, the enlarged portion 64 limits and reduces the potential of off-center loading.

The smaller diameter of the remainder of the rod 53 reduces its weight relative to a rod 53 having a constant diameter, while still ensuring that the load is not transmitted off-center. The smaller diameter of the remainder of the rod 53 also reduces resistance caused by friction between the tube 52 and the 53 while the rod 53 is traveling through the tube 52.

Additionally, the enlarged portion 64 keeps the rod 53 centered within the tube 52 as it traveling through the tube 52 during actuation.

The rod 53 will continue being driven, such that it contacts the guide 90 and is directed in an arcuate path corresponding to the shape of the guide 90. The rod 53 will continue to rotate the sprocket 56 as it translates along the guide 90. The distal end 70 of the rod 53 will ultimately travel into the overflow cavity 100 and disengage from the sprocket 56, as shown in FIG. 12. The sprocket 56 will continue to be driven by the engagement between the main body portion 62 of the rod 53 and the sprocket 56. With the rod 53 partially disengaged with the sprocket 56, the rod is in a third position.

While in the third position, the rod 53 is prevented from moving in the reverse direction in embodiments that include the rod 53 and guide 90 welding together at this position. Similarly, in embodiments having the one-way teeth 120, the rod 53 is similarly prevented from moving in the reverse direction. This is referred to as the locked position.

Figure 20:
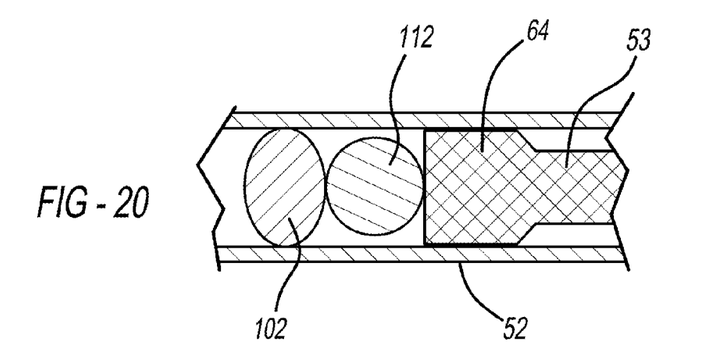
FIG. 20 is a cross-sectional view of the seal expanded circumferentially to seal against the tube during actuation of the pretensioner system.

During actuation, the seal 102 and slug 112 will also travel along the tube 52, and the travel of these components assists in driving the rod 53 through the tube 52. The seal 102 and slug 112 likewise have first, second, and third positions similar to the rod. In the second and third positions, as well as the locked position of the rod 53, the seal 102 and slug will experience backpressure from the rod 53 as it undergoes resistance contacting the sprocket 56 as well the guide 90. Thus, the seal 102 will have a circumferentially expanded state in the second and third positions, as well as when the rod 53 is in a locked position, as illustrated in FIG. 20.

Figure 21:
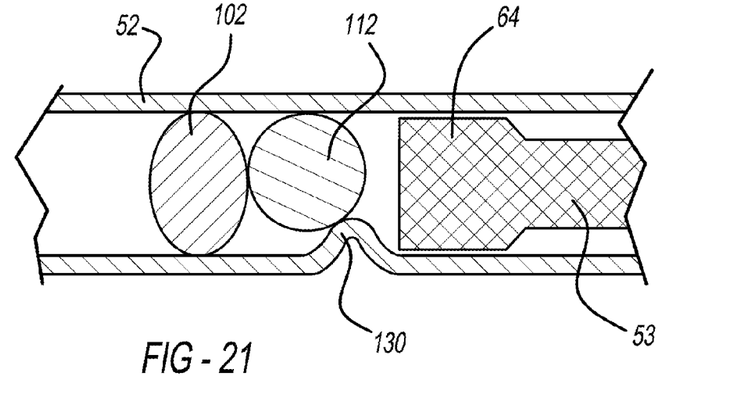
FIG. 21 is a cross-sectional view of the seal and plug being restricted by the constriction and the seal expanded circumferentially to seal against the tube during actuation of the pretensioner system.

In embodiments or instances where the rod 53, or other driving element, travels along the path far enough, possibly due to a low-resistance condition, the seal 102 and slug 112 will continue to travel through the tube 52 toward the constriction 130 (in embodiments that include the constriction 130), where the slug 112 will ultimately contact the constriction 130 at a fourth, constricted position, as shown in FIG. 21. The slug 112 will provide backpressure on the seal 102 in this constricted position, where the seal 112 will circumferentially expand to improve the sealing of gasses within the tube 52. In embodiments without the slug 112, the seal 102 would directly contact the constriction 130 and similarly expand circumferentially in response to the backpressure provided by the constriction.

A skilled artisan will appreciate that not all of the above features or components must be used together. For example, the rod 53 can be used without a welding configuration with the guide 90, the one-way teeth 120, or the constriction 130. The constriction 130 could be used in pretensioners without the rod 53, the welding, or the one-way teeth. For example, the constriction 130 can be used in traditional pretensioners using a series of balls as the driving element and still provide the improved sealing in low-resistance configurations.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A seatbelt pretensioning retractor assembly for use in a passenger vehicle, the system comprising:
    a housing adapted for being mounted to a vehicle structure;
    a tube having an arcuate and curved shape having a first end in fluid communication with a gas generator and a second end in fluid communication with an interior cavity of the housing;
    a sprocket rotatably mounted to the housing and fixedly coupled to a spindle adapted for taking up seatbelt webbing during pretensioning, the sprocket having a plurality of vanes;
    at least one driving element disposed within the tube and translatable through the tube in a first direction toward the sprocket in response to an actuation by the generator;
    a seal member disposed between the generator and the at least one driving element;
    wherein the tube includes a constriction portion having an opening smaller than the width of adjacent portions of the tube and disposed adjacent the exit, the constriction portion sized to permit the driving element to pass therethrough and to prevent the seal member from passing therethrough.

2. The assembly of claim 1, wherein the seal member extends across the width of the tube to prevent gas or fluids from traveling beyond the seal member.

3. The assembly of claim 1, wherein the constriction portion is integrally formed with the tube.

4. The assembly of claim 3, wherein the constriction portion is in the form of a bump in a sidewall of the tube.

5. The assembly of claim 4, wherein a sidewall of the tube has a constant thickness through the constriction portion.

6. The assembly of claim 3, wherein the constriction portion is in the form a protrusion.

7. The assembly of claim 1, wherein the constriction portion is in the form of a separate constriction member fixedly mounted to an interior of the tube.

8. The assembly of claim 1, wherein the constriction portion extends around the entire circumference of the tube.

9. The assembly of claim 1, wherein the constriction portion extends around a portion of the circumference of the tube that is less than the entire circumference.

10. The assembly of claim 1, wherein the constriction portion and adjacent portions of the tube form a monolithic structure.

11. The assembly of claim 1, wherein the constriction portion is located on an inboard portion of the tube.

12. The assembly of claim 1 further comprising a slug member disposed between the seal member and the driving element, wherein the constriction prevents the slug member from passing therethrough.

13. The assembly of claim 12, wherein the slug member is harder than the seal member.

14. The assembly of claim 12, wherein the seal member and slug member are generally spherical.

15. The assembly of claim 1, wherein the seal member expands circumferentially outward in response to backpressure from the constriction member during actuation of the generator.

16. The assembly of claim 1, wherein the driving element is a plurality of balls.

17. The assembly of claim 1, wherein the driving element is a plastically deformable polymer rod.

18. The assembly of claim 17, wherein the polymer rod is locked against translation in a second direction opposite that is opposite the first direction after the polymer rod has engaged the sprocket to provide pretensioning.

19. The assembly of claim 18, wherein the polymer rod is locked via a welding connection between the polymer rod and a guide portion of the housing disposed within the interior cavity of the housing, wherein the welding connection occurs in response to heat generated between the polymer rod and the guide portion.

20. A seatbelt pretensioning retractor assembly for use in a passenger vehicle, the system comprising:

a housing adapted for being mounted to a vehicle structure;

a tube having an arcuate and curved shape having a first end in fluid communication with a gas generator and a second end in fluid communication with an interior cavity of the housing;

a sprocket rotatably mounted to the housing and fixedly coupled to a spindle adapted for taking up seatbelt webbing during pretensioning, the sprocket having a plurality of vanes;

at least one driving element disposed within the tube and translatable through the tube in a first direction toward the sprocket in response to an actuation by the generator;

a seal member disposed between the generator and the at least one driving element;

wherein the tube includes a constriction portion having an opening smaller than the width of adjacent portions of the tube and disposed adjacent the exit, the constriction portion sized to permit the driving element to pass therethrough and to prevent the seal member from passing therethrough;

wherein the constriction portion comprises a plate inserted through a hole defined in the sidewall of the tube.

\* \* \* \* \*